US012737594B2

(12) United States Patent
Yuan et al.

(10) Patent No.: US 12,737,594 B2
(45) Date of Patent: Sep. 15, 2026

(54) PROCESSING OF SEQUENTIAL DATA VIA MACHINE LEARNING MODELS FEATURING TEMPORAL RESIDUAL CONNECTIONS

(71) Applicant: Google LLC, Mountain View, CA (US)

(72) Inventors: Liangzhe Yuan, Los Angeles, CA (US); Yongzhe Wang, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 667 days.

(21) Appl. No.: 18/253,416

(22) PCT Filed: Dec. 20, 2021

(86) PCT No.: PCT/US2021/064363
§ 371 (c)(1),
(2) Date: May 18, 2023

(87) PCT Pub. No.: WO2022/154943
PCT Pub. Date: Jul. 21, 2022

(65) Prior Publication Data
US 2023/0419082 A1 Dec. 28, 2023

Related U.S. Application Data

(60) Provisional application No. 63/136,772, filed on Jan. 13, 2021.

(51) Int. Cl.
*G06N 3/0464* (2023.01)

(52) U.S. Cl.
CPC .................................. *G06N 3/0464* (2023.01)

(58) Field of Classification Search
CPC ....... G06N 3/0464; G06N 20/00; G06N 3/049
See application file for complete search history.

(56) References Cited

U.S. PATENT DOCUMENTS

2020/0098139 A1 3/2020 Kaplanyan et al.
2020/0103483 A1 4/2020 Hardy et al.
(Continued)

FOREIGN PATENT DOCUMENTS

CN 111930992 11/2020
WO WO 2019143025 7/2019

OTHER PUBLICATIONS

Jang, B. et al., "Bi-Istm model to increase accuracy in text classification: combining word2vec cnn and attention mechanism," Applied Sciences, vol. 10 (Aug. 24, 2020) 14 pp. (Year: 2020).*
(Continued)

*Primary Examiner* — Brian M Smith
(74) *Attorney, Agent, or Firm* — DORITY & MANNING P.A.

(57) ABSTRACT

Systems and methods can include or leverage a machine-learned model (e.g., a convolutional neural network) that includes one or more temporal residual connections. In particular, each temporal residual connection can respectively supply one or more sets of intermediate feature data generated by a current instantiation of the model from a current sequential input to one or more other instantiations of the machine-learned model applied to process one or more other sequential inputs. For example, the other instantiations of the machine-learned model can include subsequent instantiations of the machine-learned model applied to process one or more subsequent sequential inputs that follow the current sequential input in a sequence and/or preceding instantiations of the machine-learned model applied to process one or more preceding sequential inputs that precede the current sequential input in a sequence.

22 Claims, 13 Drawing Sheets

(56) References Cited

U.S. PATENT DOCUMENTS

| | | | | |
|---|---|---|---|---|
| 2020/0225376 | A1 | 7/2020 | Liu et al. | |
| 2022/0157059 | A1 | 5/2022 | Meng et al. | |
| 2024/0153044 | A1 * | 5/2024 | Mihal | G06T 5/70 |

OTHER PUBLICATIONS

Kopuklu, O. et al., "Dissected 3d cnns: temporal skip connections for efficient online video processing," downloaed from <arxiv.org/pdf/2009.14639v1> (Sep. 30, 2020) 10 pp. (Year: 2020).*

Salur, M.U. et al., "A novel hybrid deep learning model for sentiment classification," IEEE Access (Apr. 6, 2020) pp. 58080-58093. (Year: 2020).*

Sun, X. et al., "A novel coding architecture for multi-line lidar point clouds based on clustering and convolutional lstm network," IEEE Trans. on Intelligent Transportation Systems (vol. 23, Issue 3) (0 Nov. 2020) pp. 2190-2201. (Year: 2020).*

Qui, T. et al., "Long short-term memory with dynamic skip connections," The 33rd AAAI Conf. on Artificial Intelligence (2019) pp. 6481-6488. (Year: 2019).*

Feichtenhofer, C. et al., "Temporal residual networks for dynamic scene recognition," Proc. of the IEEE Conf. on Computer Vision and Pattern Recognition (2017) pp. 4728-4737. (Year: 2017).*

International Preliminary Report on Patentability for Application No. PCT/US2021/064363, mailed Jul. 27, 2023, 10 pages.

Liu et al., "Looking Fast and Slow: Memory-Guided Mobile Video Object Detection", arXiv:1903.10172v1, Mar. 25, 2019, 10 pages.

Liu et al., "Mobile Video Object Detection with Temporally-Aware Feature Maps", Proceedings of the IEEE Conference on Computer Vision and Pattern Recognition, Jun. 18-23, 2018, Salt Lake City, UT, pp. 5686-5695.

Carreira et al., "Quo Vadis, Action Recognition? A New Model and the Kinetics Dataset.", arXiv:1705.07750v3, Feb. 12, 2018, 10 pages.

He et al., "Deep Residual Learning for Image Recognition.", arXiv:1512.03385v1, Dec. 10, 2015, 12 pages.

International Search Report for Application No. PCT/US2021/064363, mailed on Apr. 20, 2022, 2 pages.

Köpüklü et al., "Dissected 3D CNNs: Temporal Skip Connections for Efficient Online Video Processing", arxiv.org, Sep. 30, 2020, XP081774595, 10 pages.

Poggio, "Bridging the Gaps Between Residual Learning, Recurrent Neural Networks and Visual Cortex Theory of Deep Learning: View Project the MIT Vision Machine Project View Project", Apr. 12, 2016, https://arxiv.org/pdf/1604.03640v1, XP055808670, 16 pages.

Chinese Search Report Corresponding to Application No. 2021800830689 on May 14, 2025.

Chinese Search Report Corresponding to Application No. 2021800830689 on Oct. 9, 2025.

* cited by examiner

PROCESSING OF SEQUENTIAL DATA VIA MACHINE LEARNING MODELS FEATURING TEMPORAL RESIDUAL CONNECTIONS

RELATED APPLICATIONS

This application is based upon and claims the right of priority under 35 U.S.C. § 371 to International Application No. PCT/US2021/064363 filed on Dec. 20, 2021, which claims priority to and the benefit of U.S. Provisional Patent Application No. 63/136,772, filed Jan. 13, 2021. Applicant claims priority to and the benefit of each of such applications and incorporate all such applications herein by reference in its entirety.

FIELD

The present disclosure relates generally to machine learning for processing sequential data. More particularly, the present disclosure relates to a machine learning model (e.g., a neural network such as convolutional neural network) that features one or more residual connections that pass intermediate feature data between different temporal instantiations of the model.

BACKGROUND

Various machine learning tasks include the generation of predictions or inferences from sequential data such as sequential image data, audio data (e.g., speech data), textual data, sensor data, etc. As one example, given a sequence of images from a video, a video understanding model may be tasked with predicting frame-level or video-level outputs for tasks such as action recognition, object detection, or others.

In many cases, the ability to detect and understand the temporal dependencies within the sequential data itself are critical to the generation of high-quality predictions. However, many typical existing model architectures do not facilitate a temporal understanding of this nature.

Other models which do attempt to capture temporal information are inefficient or low performing. For example, three-dimensional convolution-based-models typically require inputs to be a sequence of preprocessed image frames and attempt to process all images concurrently, resulting in large memory footprint (e.g., which grows linearly with respect to the number of input frames) and offline inference. As another example, certain recurrent models (e.g., based on gated recurrent units or long short term memory units) are prone to unstable training and inferior performance.

SUMMARY

Aspects and advantages of embodiments of the present disclosure will be set forth in part in the following description, or can be learned from the description, or can be learned through practice of the embodiments.

One example aspect of the present disclosure is directed to a computing system for improved temporal processing of sequential data. The computing system includes one or more processors and one or more non-transitory computer-readable media that collectively store: a machine-learned convolutional neural network that comprises one or more temporal residual connections that respectively supply one or more sets of intermediate feature data generated from a current sequential input to one or more other instantiations of the machine-learned convolutional neural network applied to process one or more other sequential inputs; and instructions that, when executed by the one or more processors, cause the computing system to perform operations. The operations include, for each of a plurality of sequential inputs included in a sequence: processing the current sequential input with at least a portion of a current instantiation of the machine-learned convolutional neural network to generate a current set of intermediate feature data; storing the current set of intermediate feature data for provision to one or more subsequent instantiations of the machine-learned convolutional neural network applied to process one or more subsequent sequential inputs that are subsequent to the current sequential input in the sequence; accessing one or more sets of preceding intermediate feature data generated by one or more preceding instantiations of the machine-learned convolutional neural network applied to process one or more preceding sequential inputs that precede the current sequential input in the sequence; and generating a model output from the current instantiation of the machine-learned convolutional neural network based at least in part on the current set of intermediate feature data and the one or more sets of preceding intermediate feature data.

Another example aspect of the present disclosure is directed to a computer-implemented method. The method includes, for each of a plurality of sequential inputs included in a sequence: processing a current sequential input with at least a portion of a current instantiation of a machine-learned convolutional neural network to generate a current set of intermediate feature data; storing the current set of intermediate feature data for provision to one or more subsequent instantiations of the machine-learned convolutional neural network applied to process one or more subsequent sequential inputs that are subsequent to the current sequential input in the sequence, wherein the current instantiation of the machine-learned convolutional neural network is connected to the one or more subsequent instantiations of the machine-learned convolutional neural network via one or more temporal residual connections; accessing one or more sets of preceding intermediate feature data generated by one or more preceding instantiations of the machine-learned convolutional neural network applied to process one or more preceding sequential inputs that precede the current sequential input in the sequence, wherein the current instantiation of the machine-learned convolutional neural network is connected to the one or more preceding instantiations of the machine-learned convolutional neural network via the one or more temporal residual connections; and generating a model output from the current instantiation of the machine-learned convolutional neural network based at least in part on the current set of intermediate feature data and the one or more sets of preceding intermediate feature data.

Another example aspect of the present disclosure is directed to one or more non-transitory computer-readable media that collectively store: a machine-learned convolutional neural network that comprises one or more temporal residual connections that respectively supply one or more sets of intermediate feature data generated from a current sequential input to one or more other instantiations of the machine-learned convolutional neural network applied to process one or more other sequential inputs; and computer-readable instructions for executing the machine-learned convolutional neural network.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
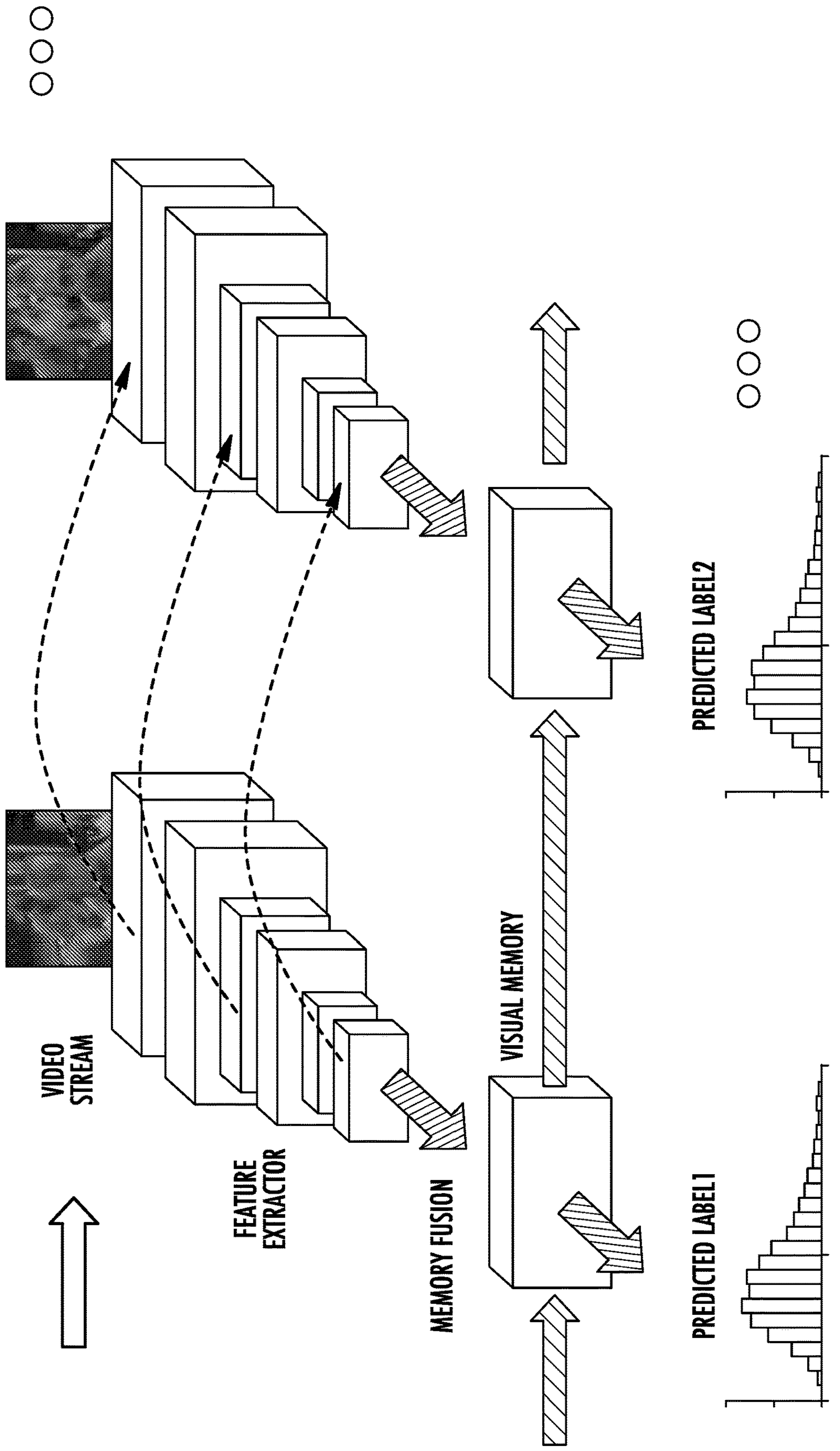
FIG. 1 depicts a graphical diagram of an example machine-learned model that includes one or more temporal residual connections according to example embodiments of the present disclosure.

Reference numerals that are repeated across plural figures are intended to identify the same features in various implementations.

DETAILED DESCRIPTION

Overview

Generally, the present disclosure is directed to systems and methods that include or leverage a machine-learned model (e.g., a convolutional neural network) that includes one or more temporal residual connections. In particular, each temporal residual connection can respectively supply one or more sets of intermediate feature data generated by a current instantiation of the model from a current sequential input to one or more other instantiations of the machine-learned model applied to process one or more other sequential inputs. For example, the other instantiations of the machine-learned model can include subsequent instantiations of the machine-learned model applied to process one or more subsequent sequential inputs that follow the current sequential input in a sequence and/or preceding instantiations of the machine-learned model applied to process one or more preceding sequential inputs that precede the current sequential input in a sequence. In such fashion, temporal information useful for modeling temporal dependencies between different portions of sequential data can be passed from one instantiation of the model to other instantiations, permitting the machine-learned model to more effectively retain and process temporal information when generating predictions/inferences.

More particularly, an example machine learning model described herein can use temporal residual connections to receive and/or send intermediate feature data (e.g., intermediate activation(s) from layer(s) of a neural network such as convolutional layers of a convolutional network) from and/or to nearby instantiations of the model. Transmitting such information across temporal residual connections can have the effect of boosting or otherwise improving the feature extraction process at each instantiation of the model. Stated differently, temporal residual connections can be used to conjunct feature maps temporally. Note that this is different from standard residual skip connection widely used in deep neural networks, which connects features maps along depth of neural networks but not across different temporal instantiations.

Thus, in some example implementations, a model can include a convolution operation $y[t]=c(x[t])$, where $x[t]$ refers to the input from time t and the convolution operation outputs $y[t]$. Example aspects of the present disclosure extend such convolution operation by taking side inputs a $[t--1], \ldots, a[t-n]$ and/or $a[t+1], \ldots, a[t+n]$, where $a[t-1]$ denotes a set of one or more activation feature maps from time $t-1$, and so forth. The side inputs for such a convolution operation act as or can be provided by residual connections temporally. Such output $y[t]=c(\text{combine}(x[t], a[t-1] \ldots a[t-n]))$ contains information not only from time t, but also from time $t-1$ to $t-n$, and where combine refers to one or more operations which combine $x[t]$ and $a[t-1] \ldots a[t-n]$ in some fashion. Moreover, in some example implementations, such an extended operation can be stacked to use in k layers in a neural network. In this case, the final feature map from a convolutional neural network would have temporal receptive fields $k^*n$.

Although the above example is discussed with respect to a convolution operation $y[t]=c(\text{combine}(x[t], a[t-1] \ldots a[t-n]))$, other operations can be performed as well, which can be represented as $y[t]=f(\text{combine}(x[t], a[t-1] \ldots a[t-n]))$, where f is any operation that applies learned parameter values to generate $y[t]$ from $\text{combine}(x[t], a[t-1] \ldots a[t-n])$. In addition, in some example implementations, the side inputs can include subsequent feature data as well, which can be represented as a $[t+1] \ldots a[t+n])$.

The information provided by temporal residual connections can be combined with existing information within the model in a number of different ways. The simplest form of residual connection is addition, which can be accomplished without rescaling if the input feature map at current timestamp and the connected feature maps from previous timestamps have the same shape.

Another form of residual connection is concatenating feature maps along the channel dimension and then applying one or more convolutions on the concatenated feature map. In some implementations, a standard residual connection can also be used to stabilize training.

Yet another example way of temporal connection is first concatenating feature maps along the channel dimensions, and then applying convolutions with different filter sizes and/or dilation rates in parallel on the concatenated feature map. A standard residual can be used as well.

The systems and methods of the present disclosure provide a number of technical effects and benefits. As one example technical effect and benefit, the proposed models can be readily deployed on CPUs and accelerators. The proposed temporal residual connections can also facilitate improved or competitive performance, even when the model is significantly smaller (e.g., has a significantly smaller number of parameters). Smaller models are faster to execute, require less storage, and consume less bandwidth when transmitted. Therefore, by enabling smaller models with improved performance, the techniques described herein can enable conservation of computing resources such as processor usage, memory usage, and network bandwidth usage. As one example, extensive experiments have shown that an example MobilenetV3-based model with temporal residual connections is 15× smaller and 7× more efficient than Resnet50-3D, with competitive performance. In addition to computational resource savings, the proposed techniques also can improve the performance of the computing system itself in performing various sequential data processing tasks.

The sequential data that is processed by the model can include any form of sequential data. As examples, the plurality of sequential inputs included in the sequence can be or include a plurality of image frames included in a video, a plurality of sets of Light Detection and Ranging (LiDAR) data included in a LiDAR data sequence, a plurality of portions of audio (e.g., as represented by raw audio data or by spectrographs), a plurality of portions of textual data (e.g., tokens, sentences, etc.), a plurality of sets of sensor data, and/or various other forms of sequential data. The task performed by the machine-learned model can include various different tasks, including, as examples, action recognition, object detection, translation, speech recognition, encoding/embedding, anomaly detection, time-to-event prediction, and/or various other tasks.

With reference now to the Figures, example embodiments of the present disclosure will be discussed in further detail.

Example Machine Learning Models Featuring Temporal Residual Connections

FIG. 1 depicts a graphical diagram of an example machine-learned model that includes one or more temporal residual connections according to example embodiments of the present disclosure. In particular, FIG. 1 shows an example temporal residual Mobilenet that includes a Mobilenet backbone with temporal residual connections. For example, one temporal residual can be added in each inverted bottleneck block to achieve a strong speed-accuracy tradeoff. For a description of Mobilenets, see Sandler et al., MobileNetV2: Inverted Residuals and Linear Bottlenecks, arXiv:1801.04381. Mobilenet is just one example backbone that can be used; many other backbones can be used alternatively. The example model of FIG. 1 is illustrated performing one example task which is video analysis (e.g., action recognition). Other tasks can be performed alternatively.

More particularly, a temporal residual can be conceptually analogized to a residual connection which is widely used in deep neural networks, with the difference of connecting in the time axis. Temporal residuals are more flexible than 3D convolution since they are capable of being applied to 2E convolutions, which are well-optimized on-device.

FIG. 1 shows an example model in which the temporal residual connections are uni-directional (e.g., in the illustrated example the model includes only forward-propagating temporal residual connections which pass information to subsequent instantiations of the model. Example implementations which feature uni-directional temporal connections do not need to access future frames to aggregate information. Therefore, the model can process stream data in an online fashion. Thus, uni-directional temporal residual connections can provide strong performance for online tasks such as online video understanding. In particular, the model does not need to access future information and can be executed in real-time, which is required for some example applications, for instance robotics, autonomous driving, surveillance, etc.

As a further example, the example model illustrated in FIG. 1 further includes a final long short term memory (LSTM) layer. Thus, at the last layer, the temporal augmented feature map from the Mobilenet with temporal residual connections is input to a convolutional LSTM. The combination of the Mobilenet with temporal residual connections and LSTM provides the following benefit: the temporal residual connections aggregate the short range temporal dependencies while the LSTM memorizes long-term context. The stacked architecture enlarges temporal receptive fields, which are critical to video action recognition tasks.

Empirical analysis demonstrated that adding one temporal residual at a layer right after strided convolution leads to the best speed-accuracy tradeoff. One example implementation of a MobilenetV2 with temporal residual connections is shown in the following Table 1.

TABLE 1

Specification for Temporal-Residual MobilenetV3-Large. T-Res Bneck denotes the temporal residual augmented bottleneck, by default, parallel atrous convolution is used as the fusion operator. Empirically it was demonstrated that inserting T-Res Bneck right after strided convolution (starting from C2) achieves the best speed-accuracy trade-off.

| Input | Operator | Output Channels | Spatial Stride |
|---|---|---|---|
| $224^2 \times 3$ | Conv2d | 16 | 2 |
| $112^2 \times 16$ | Bneck, 3 × 3 | 16 | 1 |
| $112^2 \times 16$ | Bneck, 3 × 3 | 24 | 2 |
| $56^2 \times 24$ | T-Res Bneck, 3 × 3 | 24 | 1 |
| $56^2 \times 24$ | Bneck, 5 × 5 | 40 | 2 |
| $28^2 \times 40$ | T-Res Bneck, 5 × 5 | 24 | 1 |
| $28^2 \times 40$ | Bneck, 5 × 5 | 24 | 1 |
| $28^2 \times 40$ | Bneck, 3 × 3 | 24 | 2 |
| $14^2 \times 40$ | T-Res Bneck, 3 × 3 | 80 | 1 |
| $14^2 \times 80$ | Bneck, 3 × 3 | 80 | 1 |
| $14^2 \times 80$ | Bneck, 3 × 3 | 80 | 1 |
| $14^2 \times 80$ | Bneck, 3 × 3 | 112 | 1 |
| $14^2 \times 112$ | Bneck, 3 × 3 | 112 | 1 |
| $14^2 \times 112$ | Bneck, 3 × 3 | 160 | 2 |
| $7^2 \times 160$ | T-Res Bneck, 3 × 3 | 160 | 1 |
| $7^2 \times 160$ | Bneck, 5 × 5 | 160 | 1 |
| $7^2 \times 160$ | Bneck, 5 × 5 | 160 | 1 |
| $7^2 \times 160$ | Bneck, 5 × 5 | 160 | 1 |
| $7^2 \times 160$ | GroupedConvLSTM | 640 | 1 |
| $7^2 \times 640$ | Global Pooling | — | 1 |
| $1^2 \times 640$ | Conv2d, 1 × 1, | k | 1 |

Extensive experiments on multiple datasets show that the proposed mobile model described above achieves very competitive performance compared to 3D convolutional based models, with 10× less memory footprint and computational cost. On the Kinetics600 dataset, the best MobileNetV2-based model with temporal residual connections achieves 74.57% Top1 accuracy, compared to 74.6% Top1 accuracy for Resnet50-3D. On the Moments-in-Time dataset, the proposed model achieves 30.25% Top1 accuracy, compared to 31.41% Top1 accuracy from the state-of-the-art AssembleNet-50.

FIG. 1 illustrates one example model which features temporal residual connections. However, the techniques of the present disclosure are not limited to the specific example model shown in FIG. 1. As further examples, FIGS. 2A-G depict block diagrams of example machine-learned models that include one or more temporal residual connections according to example embodiments of the present disclosure.

Figure 2A:
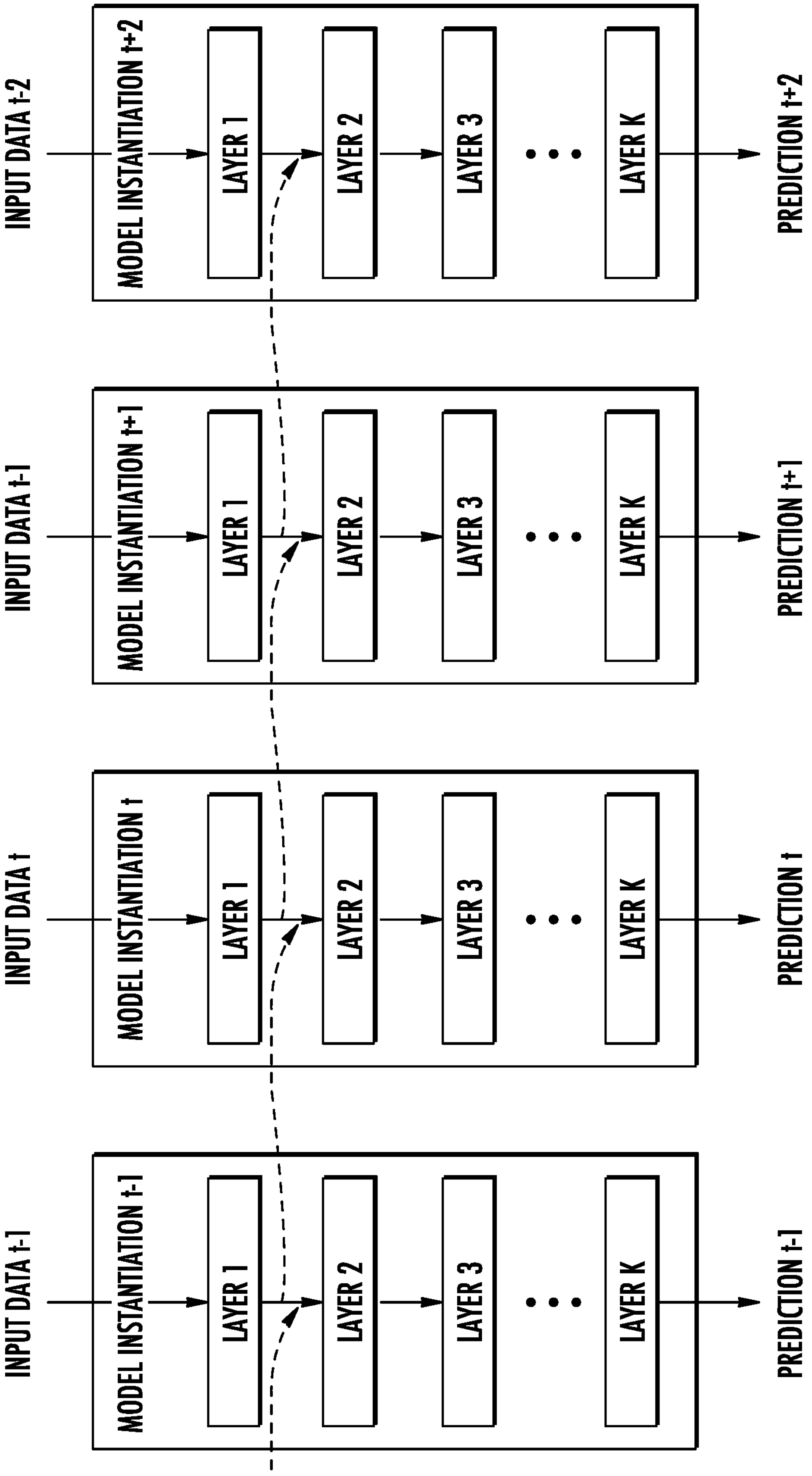
FIGS. 2A-G depict block diagrams of example machine-learned models that include one or more temporal residual connections according to example embodiments of the present disclosure.
Figure 2B:
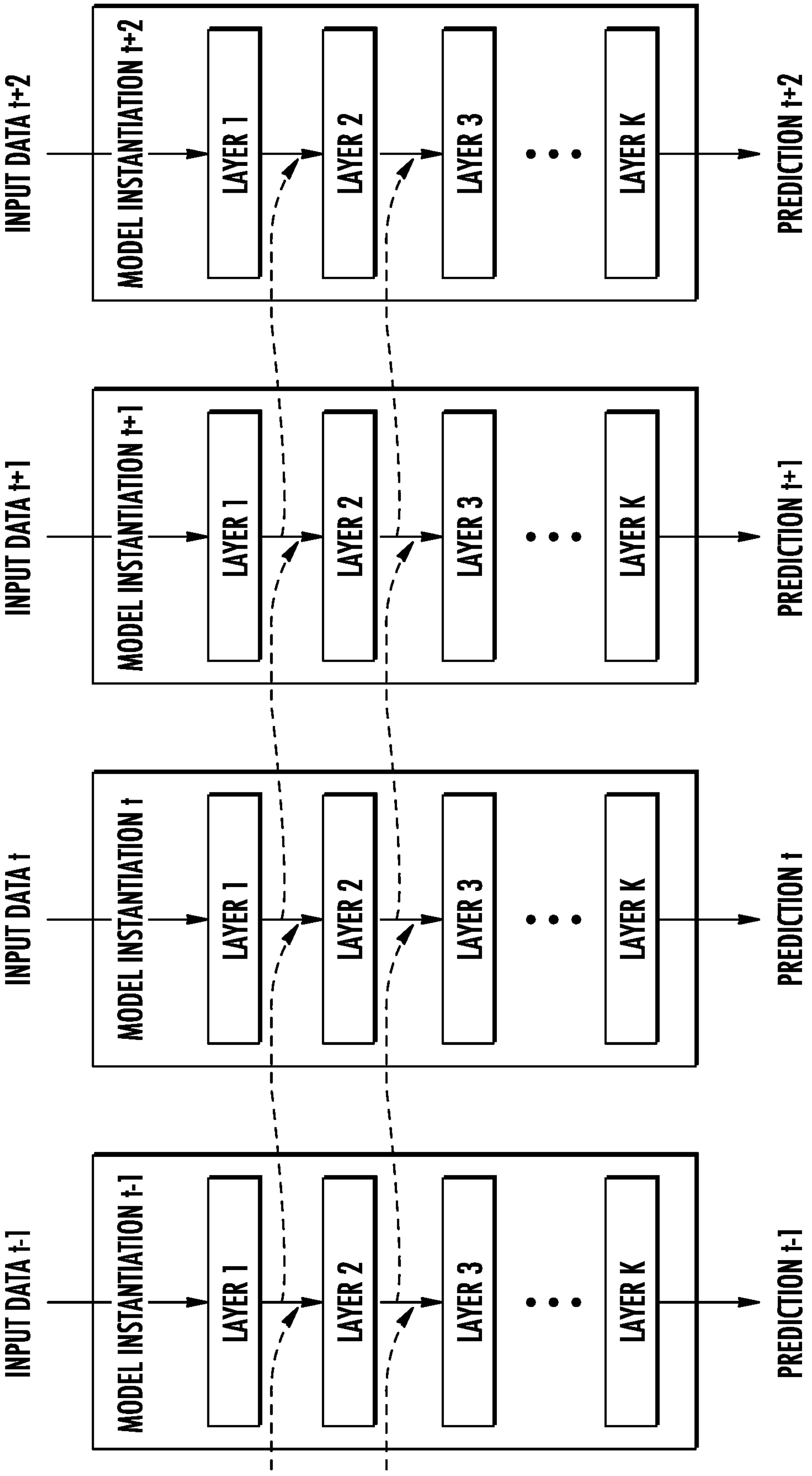

As illustrated in FIG. 2A, in some implementations, the one or more temporal residual connections can include only a single temporal residual connection per instantiation. However, as illustrated in FIG. 2B, in some implementations, a plurality of temporal residual connections can be present at different respective depths within the machine-learned model. Any number of temporal residual connections can be used.

Figure 2C:
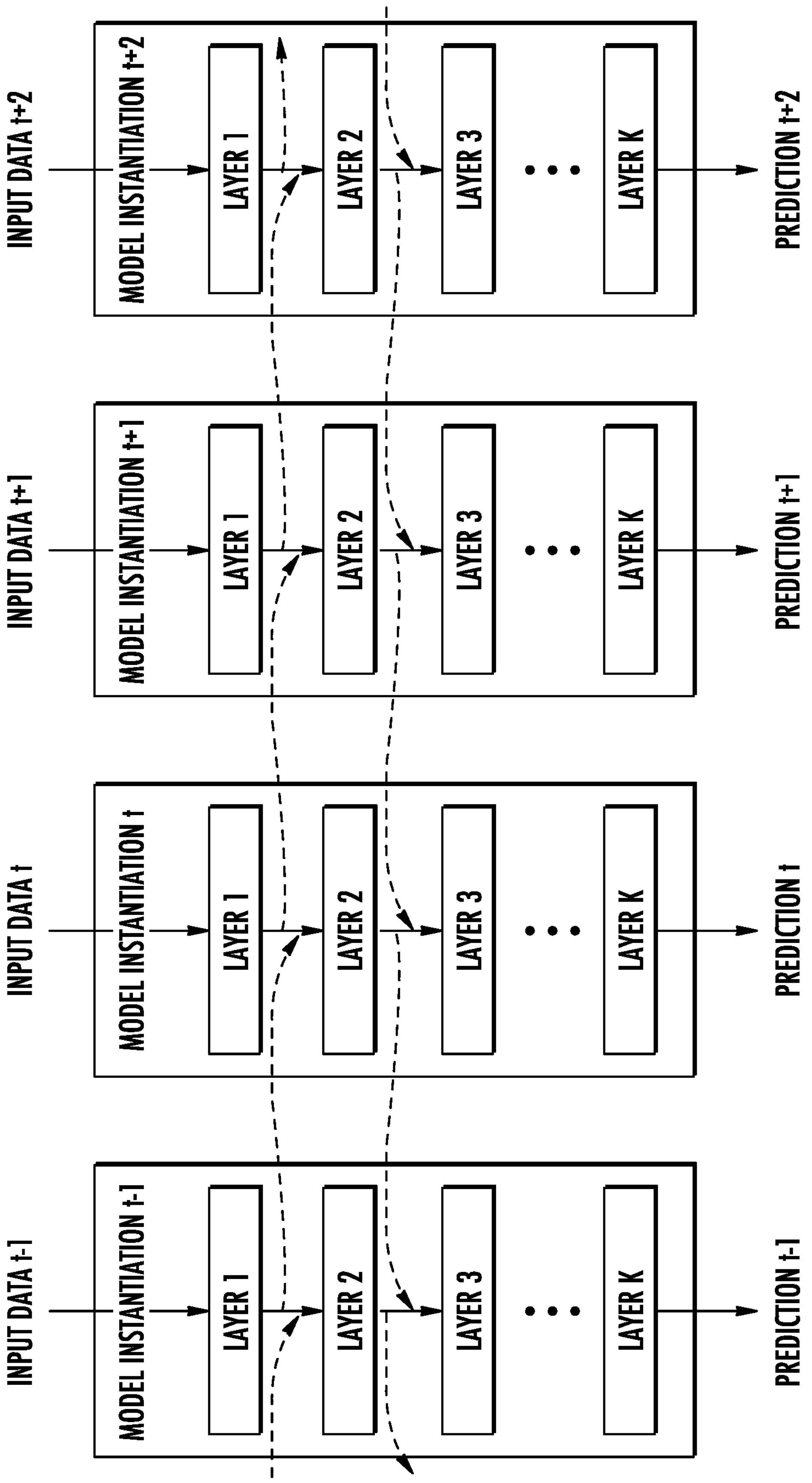
Figure 2D:
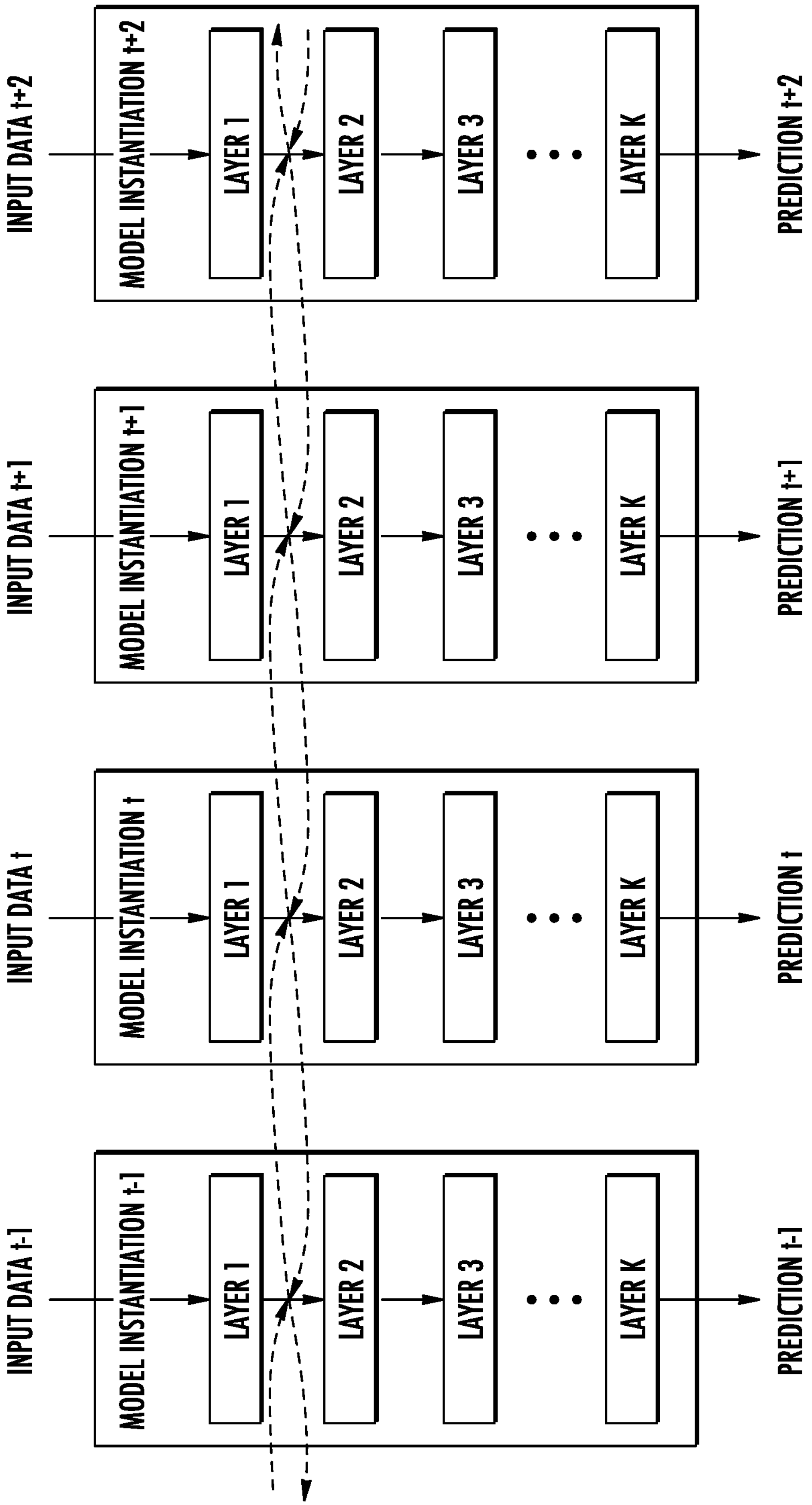

As illustrated in FIGS. 2A and 2B, in some implementations the machine-learned model can include only forward-propagating temporal residual connections that supply the one or more sets of intermediate feature data generated from the current sequential input to subsequent instantiations of the machine-learned convolutional neural network applied to process subsequent sequential inputs that are subsequent to the current input. However, as illustrated in FIG. 2C, in some implementations, the machine-learned model can include both: forward-propagating temporal residual connections that supply the one or more sets of intermediate feature data generated from the current sequential input to the subsequent instantiations of the machine-learned convolutional neural network; and backward-propagating temporal residual connections that supply the one or more sets of intermediate feature data generated from the current sequential input to preceding instantiations of the machine-learned convolutional neural network applied to process preceding sequential inputs that precede the current sequential input. The bi-directional connections can be at the different layers, as shown in FIG. 2C. As another example, as illustrated in FIG. 2D, temporal connections can be bi-directional at the same layer.

Figure 2E:
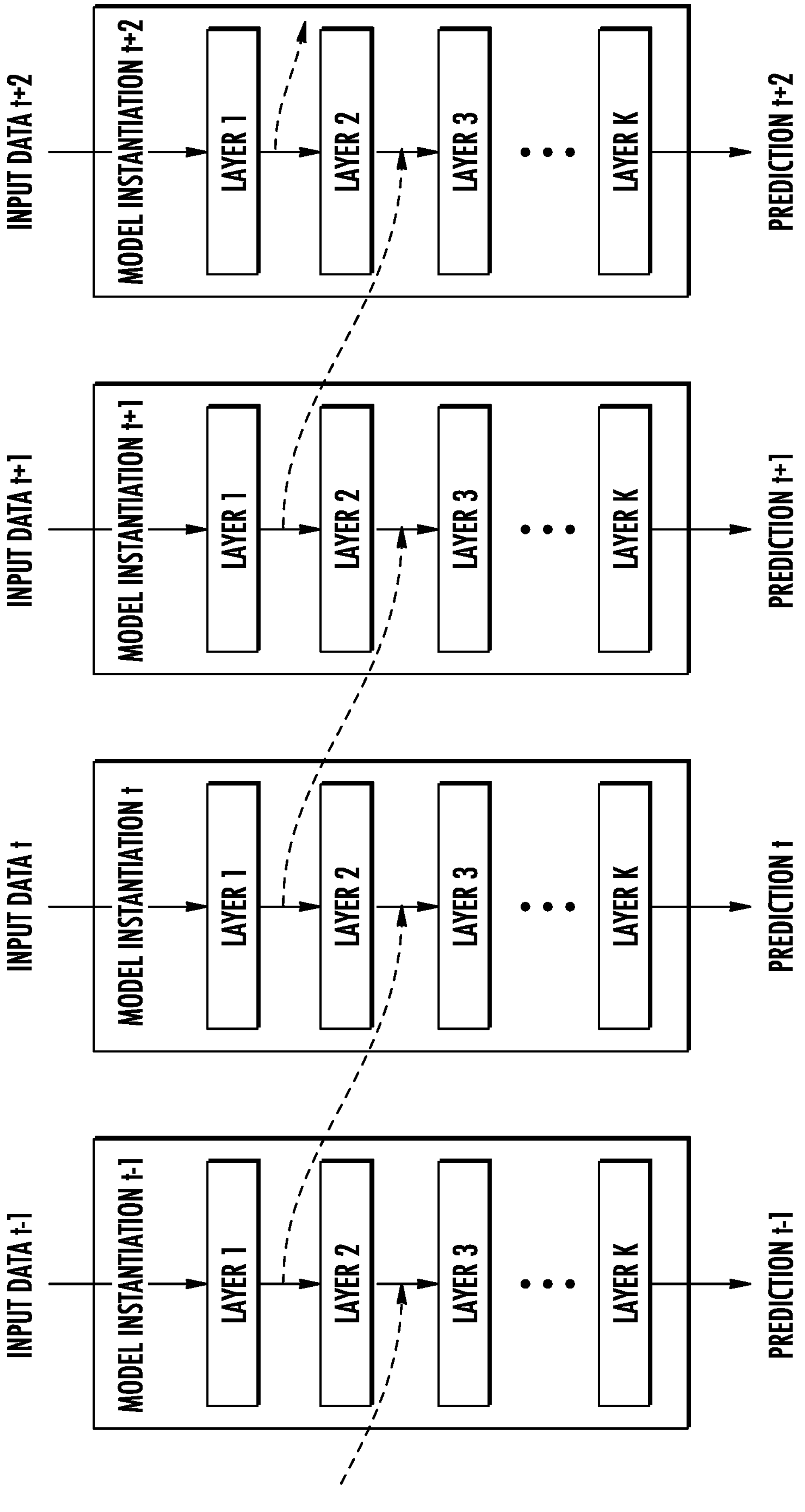

As illustrated in FIGS. 2A-D, in some implementations, some or all of the one or more temporal residual connections can be configured to supply the one or more sets of intermediate feature data to a same layer of the one or more other instantiations of the machine-learned convolutional neural network. However, as illustrated in FIG. 2E, in some implementations, some or all of the one or more temporal residual connections can be configured to supply the one or more sets of intermediate feature data to a different layer of the one or more other instantiations of the machine-learned convolutional neural network.

Figure 2F:
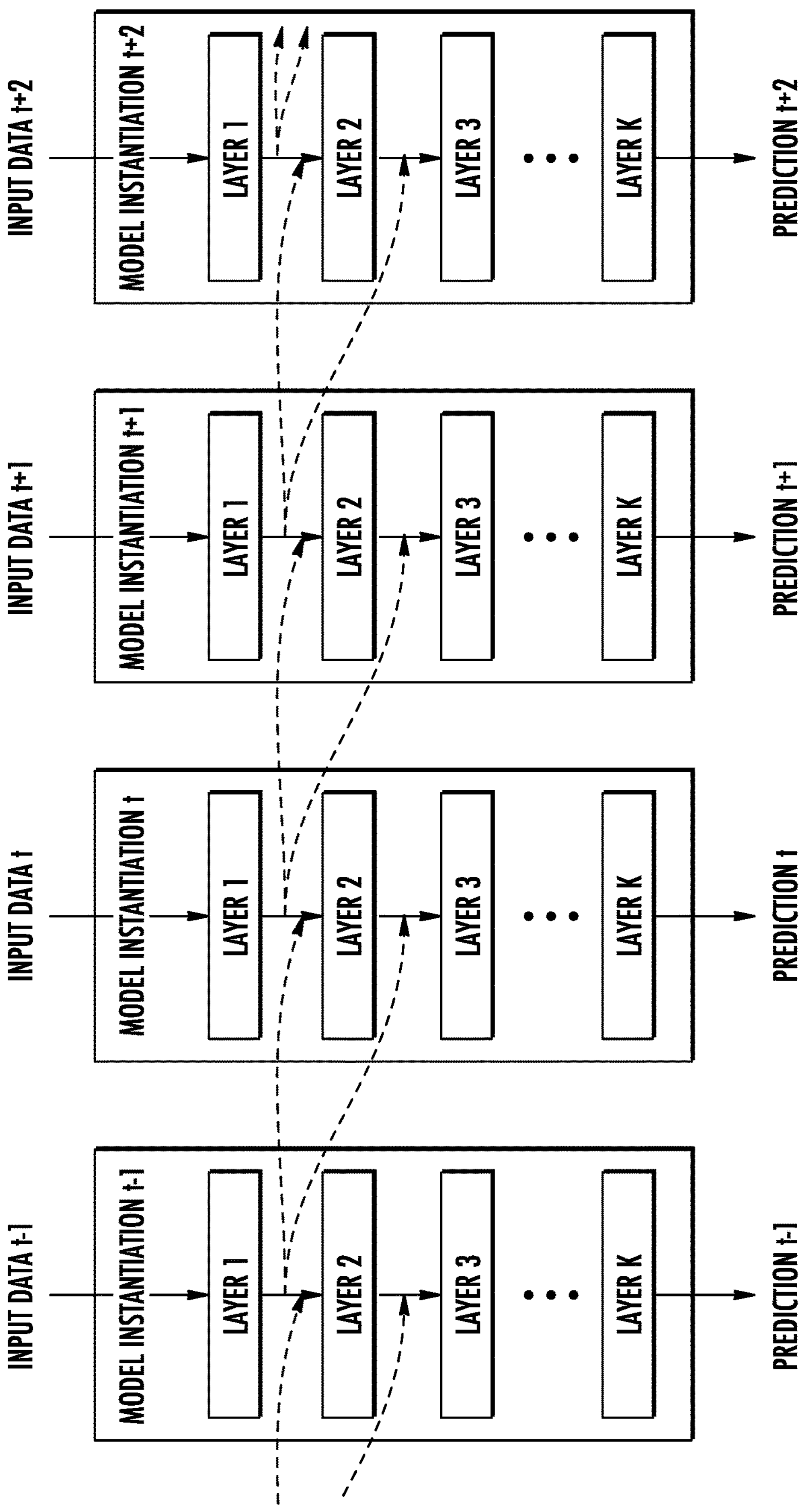

As illustrated in FIGS. 2A-E, in some implementations, each temporal residual connection can connect to unique locations in the model. However, as illustrated in FIG. 2F, in some implementations, one or more of the temporal residual connections may connect to a shared location in the model. For example, as illustrated in FIG. 2F, each instantiation of the model has two forward-propagating temporal residual connections that depart from a shared location but arrive at different locations in the next sequential instantiation of the model.

Figure 2G:
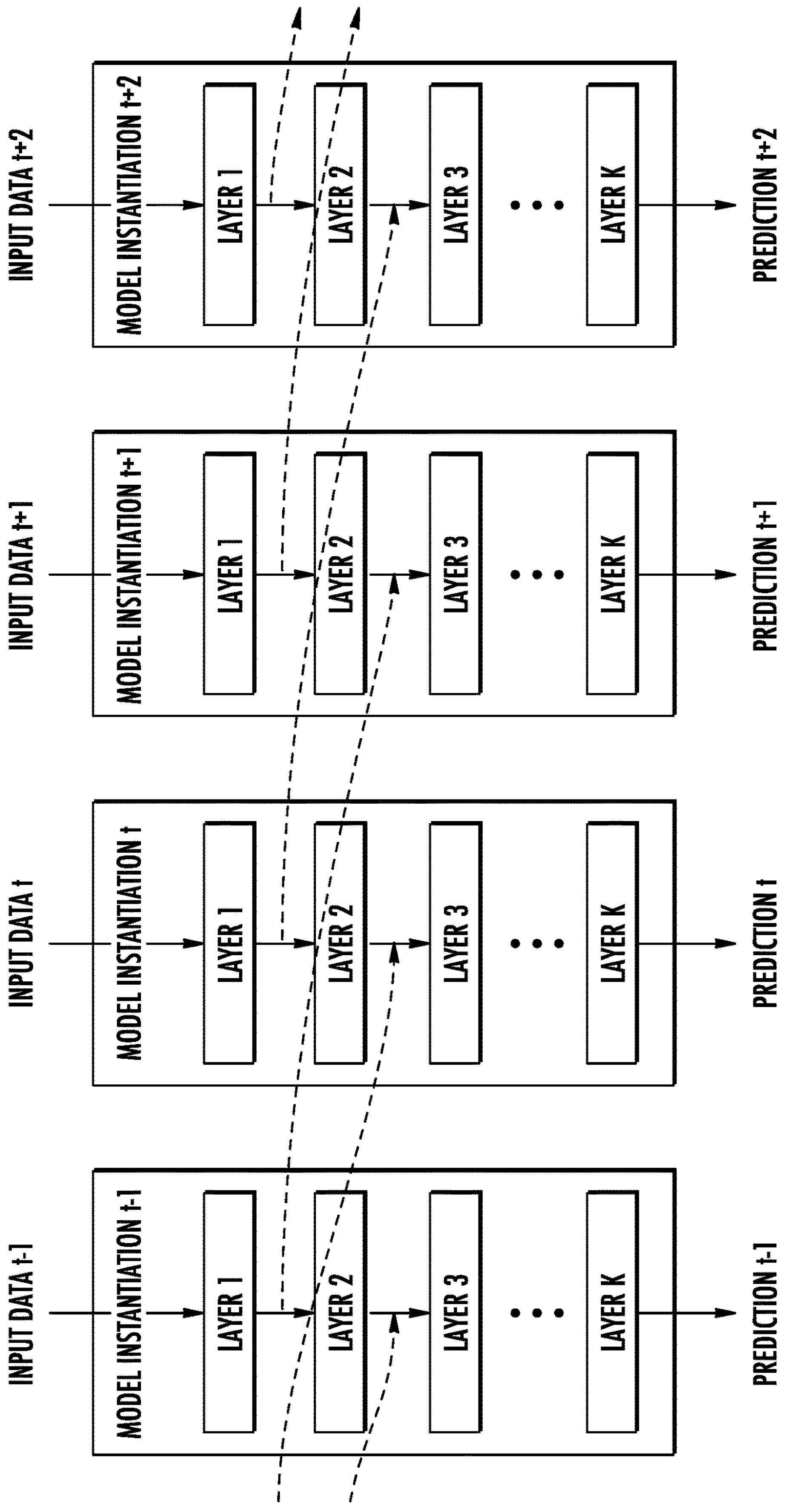

As illustrated in FIGS. 2A-F, in some implementations, each temporal residual connection can connect to an adjacent instantiation of the model (e.g., a next sequential instantiation of the model applied to process a next sequential input in the sequence and/or a previous sequential instantiation of the model applied to process a previous sequential input in the sequence). However, as illustrated in FIG. 2G, in some implementations, each temporal residual connection can connect to non-adjacent instantiation of the model (e.g., a greater-than-next sequential instantiation of the model applied to process a greater-than-next sequential input in the sequence and/or a less-than-previous sequential instantiation of the model applied to process a less-than-previous sequential input in the sequence).

Figure 3A:
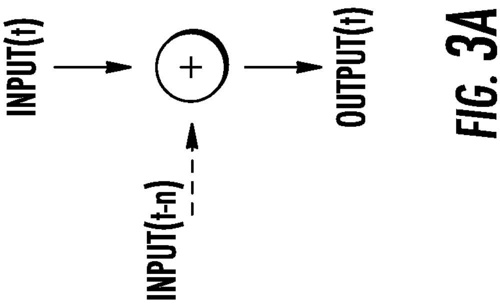
FIGS. 3A-C depict block diagrams of example temporal residual connection operations according to example embodiments of the present disclosure.
Figure 3B:
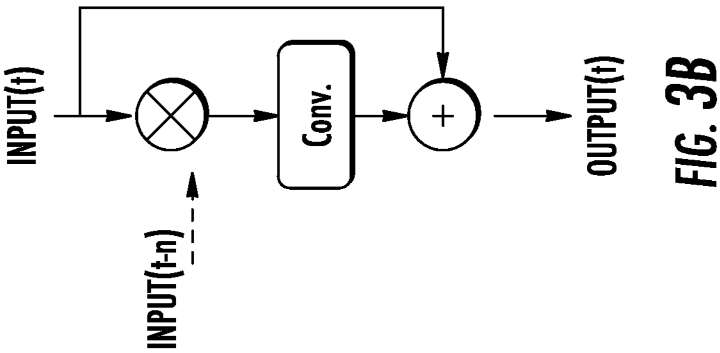
Figure 3C:
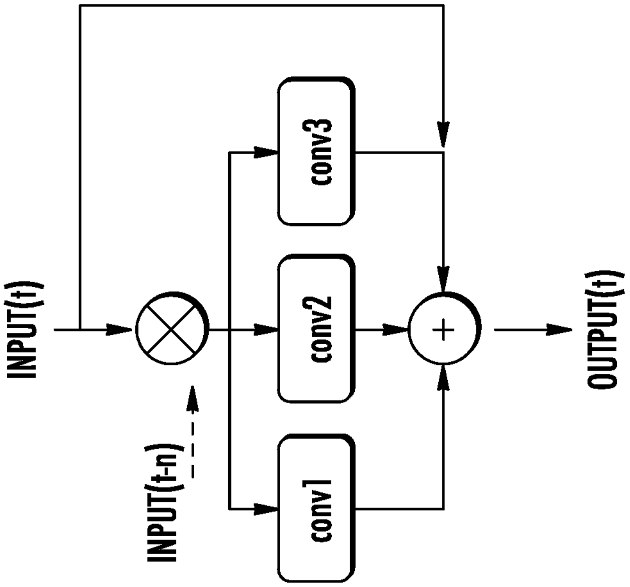

The information provided by temporal residual connections can be combined with existing information within the model in a number of different ways. As examples, FIGS. 3A-C depict block diagrams of example temporal residual connection operations according to example embodiments of the present disclosure.

The simplest form of residual connection is addition, which can be accomplished without rescaling if the input feature map at current timestamp and the connected feature maps from previous timestamps have the same shape. An illustration of an example addition connection is shown in FIG. 3A.

Another form of residual connection is concatenating feature maps along the channel dimension and then applying one or more convolutions on the concatenated feature map. In some implementations, a standard residual connection can also be used to stabilize training. An illustration of an example concatenation and convolution is shown in FIG. 3B.

Yet another example way of temporal connection is first concatenating feature maps along the channel dimensions, and then applying convolutions with different filter sizes and/or dilation rates in parallel on the concatenated feature map. A standard residual can be used as well. An example illustration of one implementation of this technique is shown in FIG. 3C. The multiple convolutions shown in FIG. 3C can have different respective filter sizes and/or different respective dilation rates. Having different filter sizes and/or different dilation rates can help the model to understand and process dependencies among the data which change in size over time. For example, a person walking toward a camera will increase in size (e.g., as represented in number of corresponding pixels) from frame t to frame t+1. Having different filter sizes and/or different dilation rates can help the model to process the changed size of the person.

Example Devices and Systems

Figure 4A:
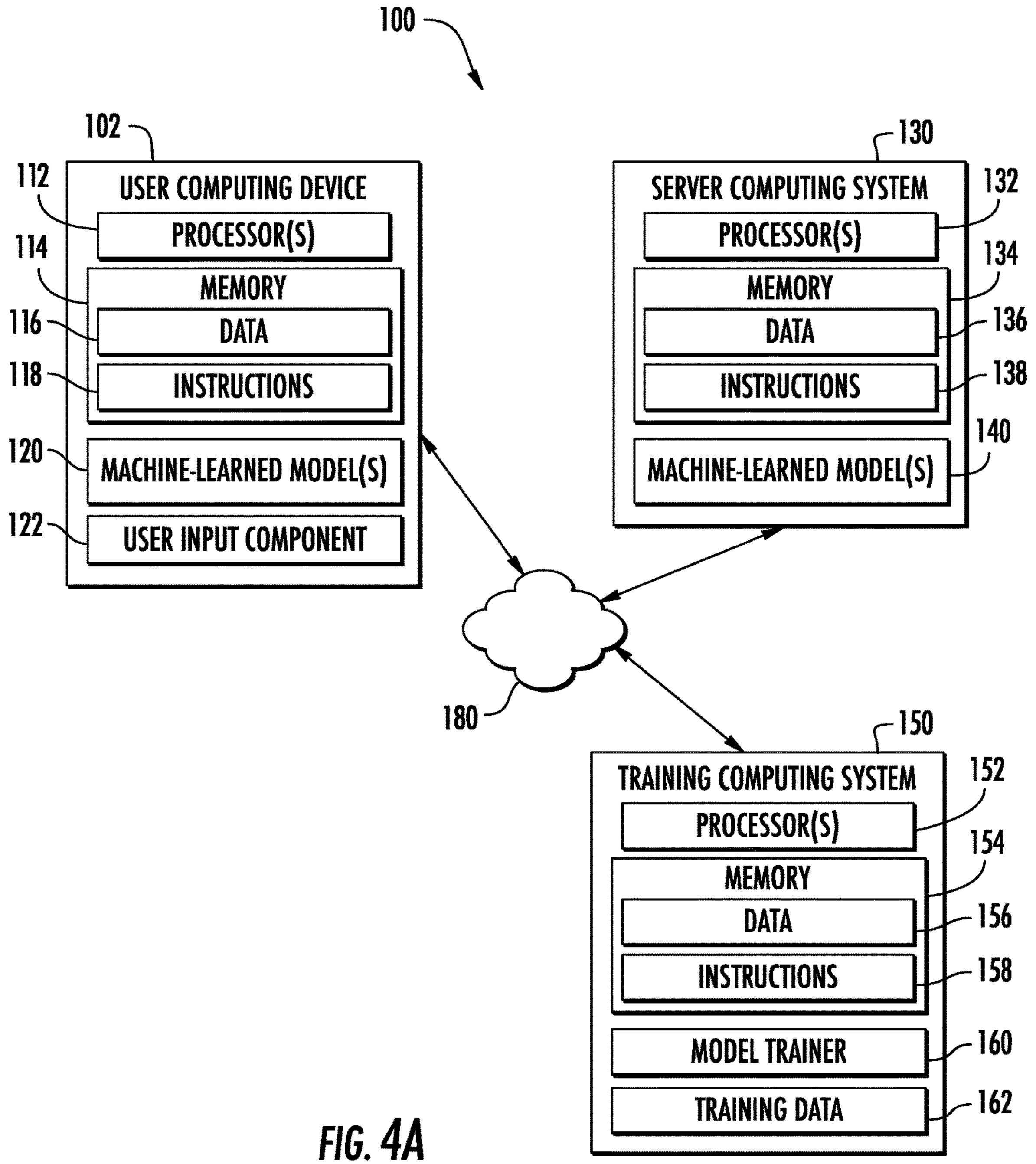
FIG. 4A depicts a block diagram of an example computing system according to example embodiments of the present disclosure.

FIG. 4A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to FIGS. 1A-3C.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instantiations of a single machine-learned model 120 (e.g., to perform parallel processing of multiple sequential inputs).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instantiations in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 1A-3C.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backward propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backward propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be audio compression task. The input may include audio data and the output may comprise compressed audio data. In another example, the input includes visual data (e.g. one or more image or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 4A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 4B:
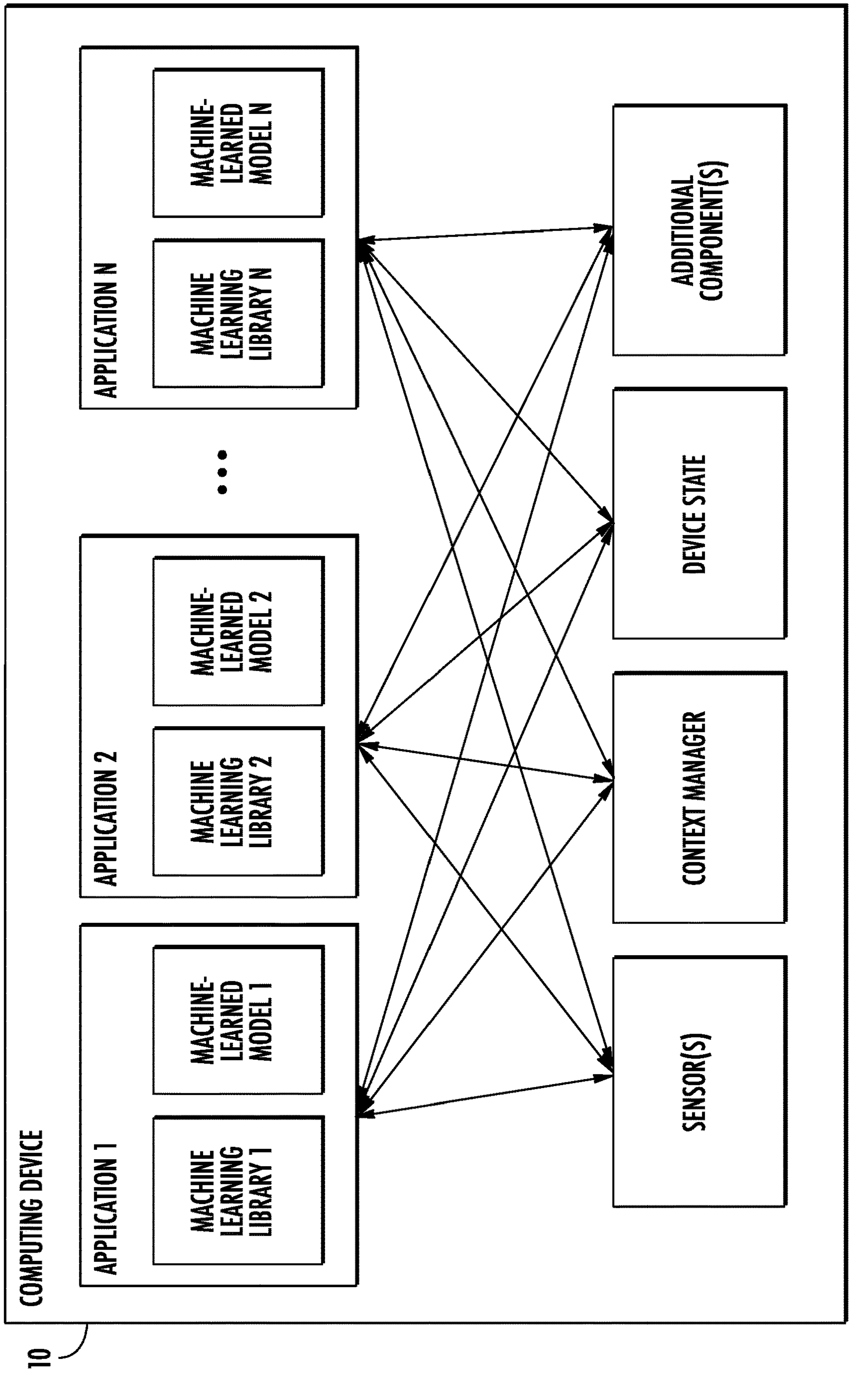
FIG. 4B depicts a block diagram of an example computing device according to example embodiments of the present disclosure.

FIG. 4B depicts a block diagram of an example computing device 10 that performs according to example embodiments of the present disclosure. The computing device can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 4B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 4C:
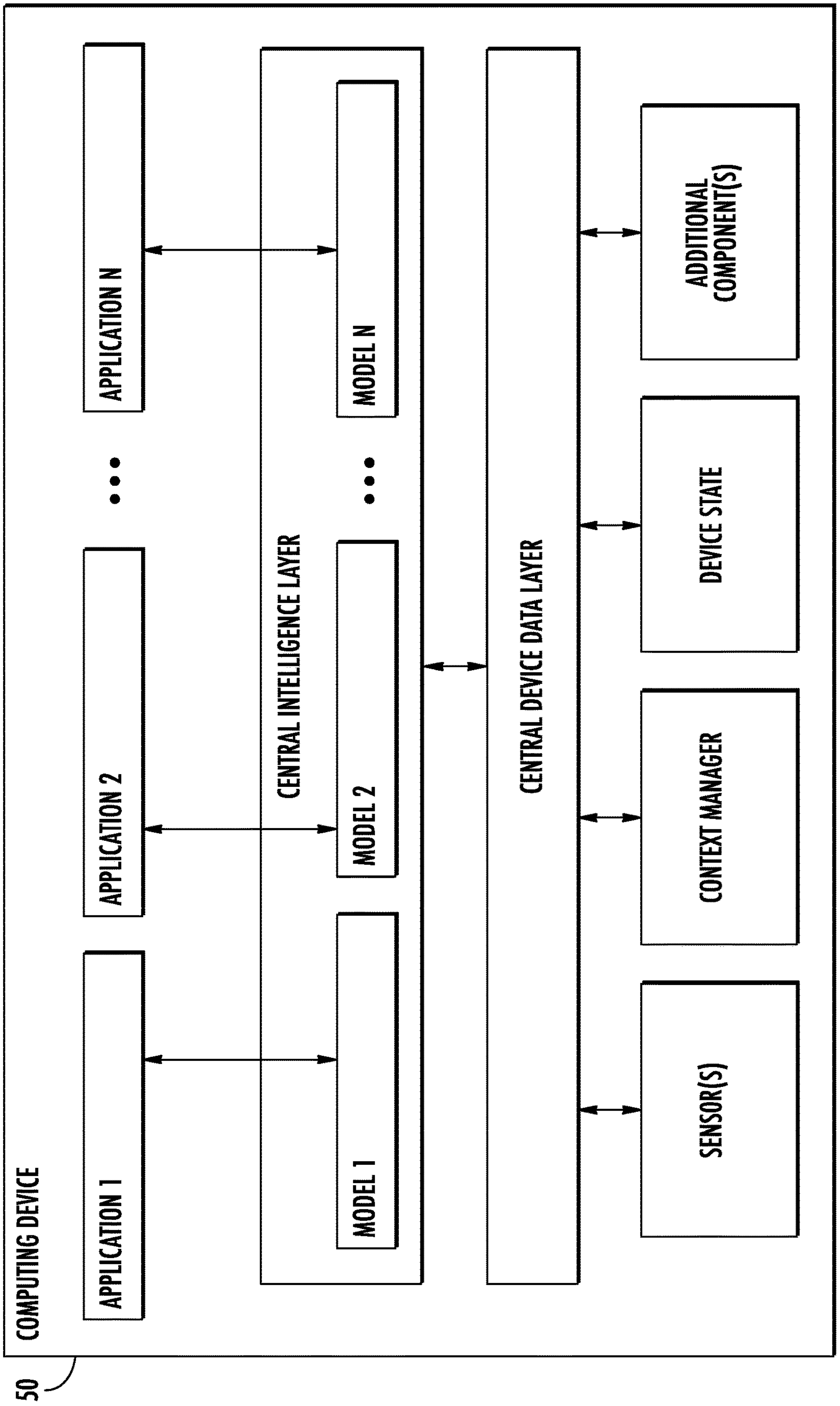
FIG. 4C depicts a block diagram of an example computing device according to example embodiments of the present disclosure.

FIG. 4C depicts a block diagram of an example computing device 50 that performs according to example embodiments of the present disclosure. The computing device can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 4C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 4C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 5:
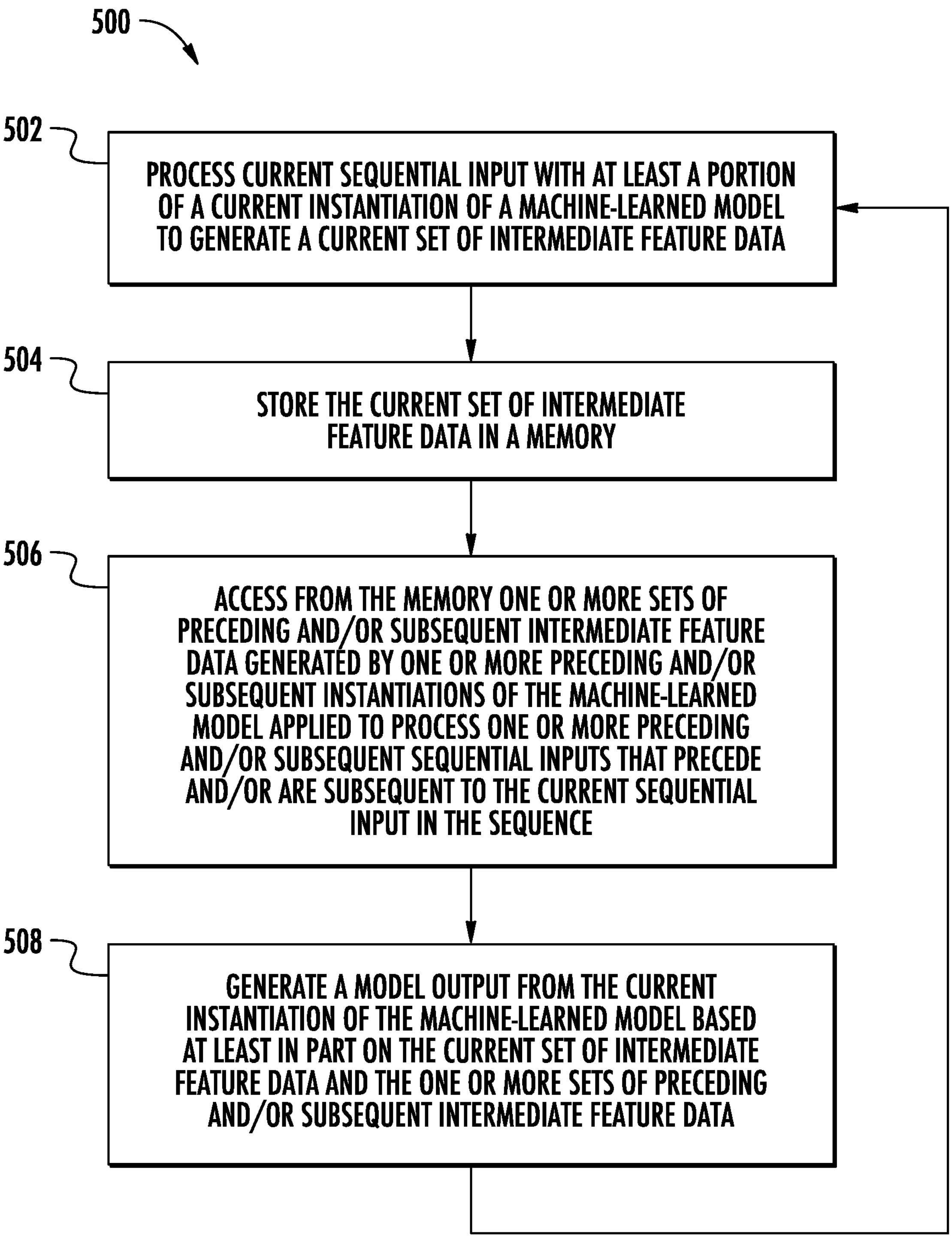
FIG. 5 depicts a flow chart diagram of an example method to employ a machine-learned model that includes one or more temporal residual connections according to example embodiments of the present disclosure.

FIG. 5 depicts a flow chart diagram of an example method for improved temporal processing of sequential data according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

In some implementations, the method 500 can be performed iteratively over a number of sequential inputs. In some instances, steps 504 and 506 can be performed multiple times per iteration if there are multiple temporal residual connections.

At 502, a computing system can process a current sequential input with at least a portion of a current instantiation of a machine-learned model to generate a current set of intermediate feature data.

At 504, the computing system can store the current set of intermediate feature data for provision to one or more preceding and/or subsequent instantiations of the machine-learned model applied to process one or more preceding and/or subsequent sequential inputs that are preceding and/or subsequent to the current sequential input in the sequence.

At 506, the computing system can access one or more sets of preceding and/or subsequent intermediate feature data generated by one or more preceding and/or subsequent instantiations of the machine-learned model applied to process one or more preceding and/or subsequent sequential inputs that precede and/or are subsequent to the current sequential input in the sequence.

At 508, the computing system can generate a model output from the current instantiation of the machine-learned model based at least in part on the current set of intermediate feature data and the one or more sets of preceding and/or subsequent intermediate feature data.

After 508, method 500 can optionally return to 502 to process the next sequential input. Alternatively, multiple instances of the method 500 can be performed in parallel to process multiple sequential inputs in parallel.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for improved temporal processing of sequential data, the computing system comprising:

one or more processors; and one or more non-transitory computer-readable media that collectively store:

a machine-learned convolutional neural network that comprises one or more temporal residual connections that respectively supply one or more sets of intermediate feature data generated from a current sequential input to a plurality of other instantiations of the machine-learned convolutional neural network applied to process a plurality of other sequential inputs; and instructions that, when executed by the one or more processors, cause the computing system to perform operations, the operations comprising:

for each of a plurality of sequential inputs included in a sequence:

processing the current sequential input with at least a portion of a current instantiation of the machine-learned convolutional neural network to generate a current set of intermediate feature data;

storing the current set of intermediate feature data for provision to a plurality of subsequent instantiations of the machine-learned convolutional neural network applied to process a plurality of subsequent sequential inputs that are subsequent to the current sequential input in the sequence;

accessing a plurality of sets of preceding intermediate feature data generated by a plurality of preceding instantiations of the machine-learned convolutional neural network applied to process a plurality of preceding sequential inputs that precede the current sequential input in the sequence, wherein the plurality of sets of preceding intermediate feature data comprise feature maps from a plurality of different previous timestamps; and generating a model output from the current instantiation of the machine-learned convolutional neural network based at least in part on the current set of intermediate feature data and the plurality of sets of preceding intermediate feature data.

2. The computing system of claim 1, wherein the one or more temporal residual connections consist only of forward-propagating temporal residual connections that supply the one or more sets of intermediate feature data generated from the current sequential input to the subsequent instantiations of the machine-learned convolutional neural network.

3. The computing system of claim 1, wherein the machine-learned convolutional neural network comprises both:

forward-propagating temporal residual connections that supply the one or more sets of intermediate feature data generated from the current sequential input to the subsequent instantiations of the machine-learned convolutional neural network; and backward-propagating temporal residual connections that supply the one or more sets of intermediate feature data generated from the current sequential input to the preceding instantiations of the machine-learned convolutional neural network.

4. The computing system of claim 1, wherein at least one of the one or more temporal residual connections is configured to supply the one or more sets of intermediate feature data to a same layer of the plurality of instantiations of the machine-learned convolutional neural network.

5. The computing system of claim 1, wherein at least one of the one or more temporal residual connections is configured to supply the one or more sets of intermediate feature data to a different layer of the plurality of other instantiations of the machine-learned convolutional neural network.

6. The computing system of claim 1, wherein the one or more temporal residual connections comprise a plurality of temporal residual connections present at different respective depths within the machine-learned convolutional neural network.

7. The computing system of claim 1, wherein generating the model output from the current instantiation of the machine-learned convolutional neural network based at least in part on the current set of intermediate feature data and the plurality of sets of preceding intermediate feature data comprises:

combining at least one of the sets of preceding intermediate feature data with at least one existing set of feature data to form a combined set of feature data; and generating the model output from the current instantiation of the machine-learned convolutional neural network based at least in part on the combined set of feature data.

8. The computing system of claim 7, wherein combining the at least one of the sets of preceding intermediate feature data with the at least one existing set of feature data to form the combined set of feature data comprises summing the at least one of the sets of preceding intermediate feature data with the at least one existing set of feature data.

9. The computing system of claim 7, wherein combining the at least one of the sets of preceding intermediate feature data with the at least one existing set of feature data to form the combined set of feature data comprises:

concatenating the at least one of the sets of preceding intermediate feature data with the at least one existing set of feature data; and applying one or more convolutions to the concatenated data.

10. The computing system of claim 7, wherein combining the at least one of the sets of preceding intermediate feature data with the at least one existing set of feature data to form the combined set of feature data comprises:

concatenating the at least one of the sets of preceding intermediate feature data with the at least one existing set of feature data;

applying multiple convolutional filters to the concatenated data in parallel; and combining the outputs of the multiple convolutional filters.

11. The computing system of claim 10, wherein the multiple convolutional filters have different respective filter sizes.

12. The computing system of claim 10, wherein the multiple convolutional filters have different respective dilation rates.

13. The computing system of claim 7, wherein the at least one existing set of feature data comprises the current set of intermediate feature data.

14. The computing system of claim 1, wherein the plurality of subsequent instantiations of the machine-learned convolutional neural network applied to process the plurality of subsequent sequential inputs comprise a next sequential instantiation of the machine-learned convolutional neural network applied to process a next sequential input in the sequence.

15. The computing system of claim 1, wherein the plurality of subsequent instantiations of the machine-learned convolutional neural network applied to process the plurality of subsequent sequential inputs comprise a greater-than-next sequential instantiation of the machine-learned convolutional neural network applied to process a greater-than-next sequential input in the sequence.

16. The computing system of claim 1, wherein the current set of intermediate feature data comprises an activation map for a convolutional layer of the machine-learned convolutional neural network.

17. The computing system of claim 1, wherein the machine-learned convolutional neural network comprises one or more convolutional layers followed by a long short term memory layer, wherein the one or more temporal residual connections are present at the one or more convolutional layers.

18. The computing system of claim 1, wherein the plurality of sequential inputs included in the sequence comprise a plurality of image frames included in a video.

19. The computing system of claim 1, wherein the plurality of sequential inputs included in the sequence comprise a plurality of sets of Light Detection and Ranging (LiDAR) data included in a LiDAR data sequence.

20. The computing system of claim 1, wherein the machine-learned convolutional neural network is configured to perform a task, wherein the task comprises action recognition or object detection.

21. A computer-implemented method, the method comprising:

for each of a plurality of sequential inputs included in a sequence:

processing a current sequential input with at least a portion of a current instantiation of a machine-learned convolutional neural network to generate a current set of intermediate feature data;

storing the current set of intermediate feature data for provision to a plurality of subsequent instantiations of the machine-learned convolutional neural network applied to process a plurality of subsequent sequential inputs that are subsequent to the current sequential input in the sequence, wherein the current instantiation of the machine-learned convolutional neural network is connected to the plurality of subsequent instantiations of the machine-learned convolutional neural network via one or more temporal residual connections;

accessing a plurality of sets of preceding intermediate feature data generated by a plurality of preceding instantiations of the machine-learned convolutional neural network applied to process a plurality of preceding sequential inputs that precede the current sequential input in the sequence, wherein the current instantiation of the machine-learned convolutional neural network is connected to the a plurality of preceding instantiations of the machine-learned convolutional neural network via the one or more temporal residual connections, wherein the plurality of sets of preceding intermediate feature data comprise feature maps from a plurality of different previous timestamps; and generating a model output from the current instantiation of the machine-learned convolutional neural network based at least in part on the current set of intermediate feature data and the plurality of sets of preceding intermediate feature data.

22. One or more non-transitory computer-readable media that collectively store:

a machine-learned convolutional neural network that comprises one or more temporal residual connections that respectively supply one or more sets of intermediate feature data generated from a current sequential input to a plurality of other instantiations of the machine-learned convolutional neural network applied to process a plurality of other sequential inputs; and computer-readable instructions for executing the machine-learned convolutional neural network instructions that, when executed by one or more processors, cause a computing system to perform operations, the operations comprising:

for each of a plurality of sequential inputs included in a sequence:

processing the current sequential input with at least a portion of a current instantiation of the machine-learned convolutional neural network to generate a current set of intermediate feature data;

storing the current set of intermediate feature data for provision to a plurality of subsequent instantiations of the machine-learned convolutional neural network applied to process a plurality of subsequent sequential inputs that are subsequent to the current sequential input in the sequence;

accessing a plurality of sets of preceding intermediate feature data generated by a plurality of preceding instantiations of the machine-learned convolutional neural network applied to process a plurality of preceding sequential inputs that precede the current sequential input in the sequence, wherein the plurality of sets of preceding intermediate feature data comprise feature maps from a plurality of different previous timestamps; and generating a model output from the current instantiation of the machine-learned convolutional neural network based at least in part on the current set of intermediate feature data and the plurality of sets of preceding intermediate feature data.

* * * * *